(12) United States Patent
Tsuruya et al.

(10) Patent No.: US 7,095,847 B2
(45) Date of Patent: Aug. 22, 2006

(54) DC/DC CONVERTER AND SUBSCRIBER LINE INTERFACE CIRCUIT

(75) Inventors: Kenichi Tsuruya, Tokyo (JP); Keiichi Busujima, Saitama (JP); Nobuhiro Nakajima, Chiba (JP); Naoki Matsushima, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 267 days.

(21) Appl. No.: 10/701,629

(22) Filed: Nov. 6, 2003

(65) Prior Publication Data

US 2004/0091097 A1     May 13, 2004

(30) Foreign Application Priority Data

Nov. 8, 2002   (JP) .............. 2002-324765

(51) Int. Cl.
  H04M 1/00   (2006.01)
  H04M 9/00   (2006.01)
  H04M 9/08   (2006.01)
(52) U.S. Cl. ............ 379/399.02; 379/412; 379/413.03; 379/413.04
(58) Field of Classification Search .......... 379/399.01, 379/413.04
See application file for complete search history.

(56) References Cited

U.S. PATENT DOCUMENTS

| 5,051,666 | A | * | 9/1991 | Jensen ...................... 315/307 |
| 5,960,075 | A | * | 9/1999 | Sutherland et al. .... 379/413.01 |
| 6,137,280 | A | * | 10/2000 | Ackermann et al. ........ 323/354 |
| 2002/0186071 | A1 | * | 12/2002 | Miyazaki et al. ........... 327/534 |

\* cited by examiner

*Primary Examiner*—Fan Tsang
*Assistant Examiner*—Ramnandan Singh
(74) *Attorney, Agent, or Firm*—Rabin & Berdo, P.C.

(57) ABSTRACT

A DC/DC converter capable of preventing abnormal temperature increase in a power transistor. The DC/DC converter comprises a loop circuit, a power transistor, an abnormal high temperature detection circuit, and an abnormality processing circuit. The power transistor supplies an electric current to the loop circuit according to a control pulse signal. The loop circuit accumulates electromagnetic energy in an inductor when the electric current is supplied and generates a negative DC voltage by causing a loop electric current to flow by using the electromagnetic energy accumulated in the inductor when no electric current is supplied. The abnormal high temperature detection circuit detects a normal/abnormal state of temperature of the power transistor. The abnormality processing circuit switches the power transistor off when the abnormal high temperature detection circuit has detected that the temperature of the power transistor is abnormal.

26 Claims, 6 Drawing Sheets

(A) 1A (B) N1

(A) 1A (B) N1

DC/DC CONVERTER AND SUBSCRIBER LINE INTERFACE CIRCUIT

BACKGROUND OF THE INVENTION

1. Field of the Invention

The present invention relates to a DC/DC converter and a subscriber line interface circuit (SLIC) using such. The SLIC is carried by a gateway unit such as a Voice over Internet Protocol (VoIP) gateway unit.

2. Description of Related Art

A gateway unit is a device for mutual connection of networks or systems using different protocols. In other words, the gateway unit conducts mutual conversion of different protocols. A VoIP gateway unit is known as one of gateway units. The VoIP gateway unit is a device for connecting a telephone network with the internet. In other words, the VoIP gateway unit conducts mutual conversion of a voice communication protocol and an internet protocol.

The VoIP gateway unit carries multiple SLIC. One SLIC accommodates one subscriber line. The SLIC executes a voice communication protocol between the telephones connected to the subscribed line, i.e. subscriber telephones. Chips of a large number of types have already been marketed as LSI (Large Scale Integrated circuits) for SLIC. For example, ProSLIC Si3210 (trade name) by Silicon Laboratory Inc. is known as a SLIC chip. With the SLIC chip, the values such as a voice level or ringer frequency can be set by a program. Those set values are stored in a register provided inside the SLIC chip. A SLIC module is composed by the SLIC chip and peripheral circuits.

A SLIC supplies a voltage to a subscriber telephone via a subscriber line. The voltage supplied to the subscriber telephone varies according to a communication state. For example, a SLIC supplies to a subscriber telephone a voltage −64 V in a waiting mode, −91.5 V when a ringer rings, and −15 V in an off-hook mode. Switching of the supplied voltage is controlled by the above-described SLIC. A SLIC comprises as one of peripheral circuits a DC/DC converter for converting a drive voltage (for example 9 V) into those voltages.

Abnormal heat generation in the DC/DC converter causes malfunction of the SLIC. Therefore, in order to ensure reliability of the SLIC, it is desirable that the temperature of the DC/DC converter be stringently controlled.

SUMMARY OF THE INVENTION

It is an object of the present invention to provide a DC/DC converter capable of accurately conducting the temperature control.

The DC/DC converter in accordance with the present invention comprises a loop circuit for accumulating electromagnetic energy in an inductor when an electric current is supplied and generating a negative DC voltage by causing a loop electric current to flow by using the electromagnetic energy accumulated in the inductor when no electric current is supplied; a power transistor for supplying the electric current supplied from a drive power source line to the loop circuit when the potential of a control pulse signal is at an active level; an abnormal high temperature detection circuit for detecting a normal/abnormal state of temperature of the power transistor; and an abnormality processing circuit for making said power transistor not to supply the electric current to said loop circuit when the abnormal high temperature detection circuit has detected that the temperature of the power transistor is abnormal.

In the DC/DC converter in accordance with the present invention, the abnormality processing circuit can switch off the power transistor when the abnormality high temperature detection circuit has detected the abnormal temperature of the power transistor.

The subscriber line interface circuit in accordance with the present invention comprises a loop circuit for accumulating electromagnetic energy in an inductor when an electric current is supplied and generating a negative DC voltage by causing a loop electric current to flow by using the electromagnetic energy accumulated in the inductor when no electric current is supplied; a power transistor for supplying the electric current supplied from a drive power source line to the loop circuit when the potential of a control pulse signal is at an active level; a SLIC control circuit for generating the control pulse signal of a duty ratio corresponding to the value of a DC voltage generated by the loop circuit; an abnormal high temperature detection circuit for detecting a normal/abnormal state of temperature of the power transistor; and an abnormality processing circuit for switching the power transistor off when the abnormal high temperature detection circuit has detected that the temperature of the power transistor is abnormal.

In the subscriber line interface circuit in accordance with the present invention, the abnormality processing circuit can switch off the power transistor when the abnormality high temperature detection circuit has detected the abnormal temperature of the power transistor.

BRIEF DESCRIPTION OF THE DRAWINGS

Other objects and advantages of the present invention will be explained with reference to the accompanying drawings.

DESCRIPTION OF THE PREFERRED EMBODIMENTS

Figure 1:
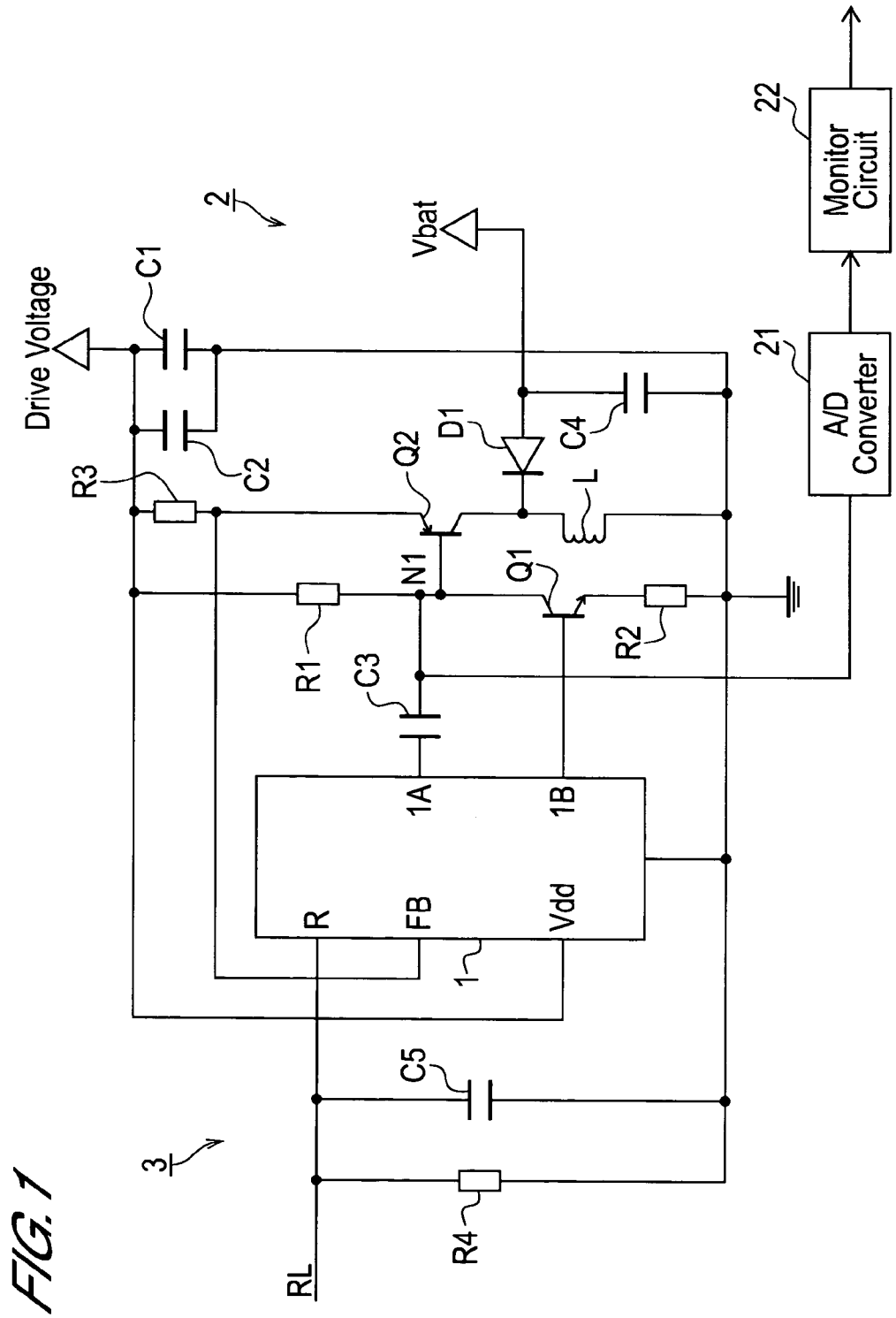
FIG. 1 is a circuit diagram of the main configuration of the SLIC of the first embodiment.

The embodiments of the present invention will be described hereinbelow by using the drawings. In the drawings, the size, shape and mutual arrangement of structural components are shown schematically merely to facilitate the understanding of the present invention, and the numerical conditions explained hereinbelow are nothing but simple examples.

First Embodiment

FIG. 1 is a circuit diagram illustrating the main configuration of the SLIC of the first embodiment. As shown in FIG. 1, the SLIC comprises a chip 1, a DC/DC converter 2, and a reset signal stabilization circuit 3.

The chip 1 is an LSI for the SLIC. For example, the above-mentioned ProSLIC Si3210 can be used as the chip 1. As shown in FIG. 1, the chip 1 comprises a drive voltage input terminal Vdd, a feedback voltage input terminal FB, signal output terminals 1A, 1B, and a reset signal input terminal R. The drive voltage input terminal Vdd inputs a voltage of a drive power source line VDD. The feedback voltage input terminal FB inputs the drain voltage of the below-described power transistor Q2. As described hereinbelow, the ON/OFF state of a power transistor Q2 can be recognized by the drain voltage of the power transistor Q2. The signal output terminals 1A, 1B output the signals 1A, 1B for controlling the output voltage VBAT of the DC/DC converter 2. The control signals 1A, 1B are complementary pulse signals. As described hereinbelow, an output voltage Vbat is determined by the duty ratio of the control signal 1B. The reset signal input terminal R inputs a reset signal from the reset signal stabilization circuit 3. The chip 1 is reset by this reset signal.

The DC/DC converter 2 generates a voltage supplied to a subscriber phone via a subscriber line. The supplied voltage varies according to the communication state. The value of the supplied voltage is controlled by the chip 1. As shown in FIG. 1, the DC/DC converter 2 comprises transistors Q1, Q2, capacitors C1–C4, resistors R1–R3, an inductor L, a diode D1, an A/D converter 21 and a monitor circuit 22. In the n-type transistor Q1, the drain is connected to a node N1, the source is connected to one terminal of the resistor R2, and the gate is connected to the signal output terminal 1B of the chip 1. In the p-type transistor Q2, the source is connected to one terminal of the resistor R3, the drain is connected to one terminal of the inductor L, and the gate is connected to node N1. The resistor R1 is connected by one terminal thereof to the node N1 and by the other terminal thereof to the power source line VDD. Other terminal of resistors R2 is connected to the ground line GND, and other terminal of resistor R3 is connected to the drive power source line VDD. Furthermore, the other terminal of the inductor L is connected to the ground line GND. The capacitors C1, C2 are connected by one terminal thereof to the drive power source line VDD and by the other terminal thereof to the ground line GND. The capacitor C3 is connected by one terminal thereof to the signal output terminal 1A of the chip 1 and by the other terminal thereof to the node N1. The capacitor C4 is connected by one terminal thereof to the other terminal of the inductor L and by the other terminal thereof to the anode of diode D1. The cathode of the diode D1 is connected to one terminal of the inductor L. The voltage output terminal Vbat is connected to the connection point of the other terminal of the capacitor C4 and the anode of diode D1. The A/D converter 21 converts the potential of the node N1 into a digital signal. The monitor circuit 22 monitors potential changes in the node N1 by using the digital signal inputted from the A/D converter 21 and sends the monitoring results to an external processing circuit, for example a CPU (Central Processing Unit). The details of the monitoring method will be described below. In the present embodiment, the capacitor C3 and the transistor Q2 are disposed as close to each other as possible. A capacitor with an F characteristic, that is, a characteristic with a capacitance inverse proportional to a temperature is used as the capacitor C3. For example, a laminated ceramic capacitor is known as a capacitor having the F characteristic.

The reset signal stabilization circuit 3 removes noise from the reset signal supplied to the chip 1. As shown in FIG. 1, the reset signal stabilization circuit 3 comprises a capacitor C5 and a resistor R4. The capacitor C5 and the resistor R4 are connected by one end thereof to a reset signal line RL and by the other end thereof to the ground line GND.

The operation principle of the DC/DC converter 2 will be described below.

The capacitors C1, C2 absorb fluctuations of voltage VDD supplied from the drive power source line VDD to the chip 1 and other elements C3, C4, R1–R4, Q1, Q2.

As mentioned hereinabove, the signal output terminals 1A, 1B of the chip 1 output complementary control signals 1A, 1B.

When the control signal 1A is a low-level signal, the control signal 1B is a high-level signal. If the control signal 1B is a high-level signal, the n-type transistor Q1 is switched on. As a result, an electric current flows from the power source line VDD to the ground line GND via the elements R1, Q1, R2. The potential of the node N1 at this time is determined according to the resistance of elements R1, Q1, R2 and capacitance of capacitor C3. The DC/DC converter 2 is designed so that the potential of the node N1 at this time assumes a value lower than the operation threshold value of the PMOS transistor Q2. Therefore, when the control signal 1A is a low-level signal and the control signal 1B is a high-level signal, the pMOS transistor Q2 is switched on. When the pMOS transistor Q2 is switched on, an electric current is supplied from the power source line VDD to the inductor L via the resistor R3 and transistor Q2. Due to this electric current, electromagnetic energy is accumulated in the inductor L. When the p-type power transistor Q2 is switched on, an electric current flows in the resistor R3. Therefore, owing to voltage drop in the resistor R3, the source potential of the p-type power transistor Q2 assumes a value lower than the drive voltage VDD. As mentioned hereinabove, the source potential of the transistor Q2 is inputted in the feedback voltage input terminal FB of the chip 1. The chip 1 recognizes that the p-type power transistor Q2 has been switched on based on the potential of the terminal FB.

If the control signal 1A changes to a high-level signal and the control signal 1B changes to a low-level signal, then the n-type transistor Q1 is switched off. As a result, the potential of the node N1 becomes a drive voltage VDD. Therefore, the p-type power transistor Q2 is switched off. If the p-type power transistor Q2 is switched off, the electromagnetic energy accumulated in the inductor L causes a direct electric current to flow in a loop circuit composed of the inductor L, capacitor C4, and diode D1. Owing to this electric current, a negative DC voltage Vbat is generated. Further, if the p-type power transistor Q2 is switched off, the voltage drop on the resistor R3 is eliminated. Therefore, the potential applied to the feedback voltage input terminal FB of chip 1 becomes the drive voltage VDD. The chip 1 recognizes that the p-type transistor has been switched off based on the potential of the terminal FB.

If the control signal 1A then changes to a low-level signal and the control signal 1B changes to a high-level signal, the inductor L again accumulates electromagnetic energy.

Because of the above-described operations, accumulation of electromagnetic energy and generation of negative DC voltage Vbat in the DC/DC converter 2 are repeated. The value of voltage Vbat changes according to the ratio of ON time and OFF time in the p-type power transistor Q2. Therefore, the chip 1 can control the value of voltage Vbat by controlling the duty ratio of the control signal 1B.

The capacitor C3 is used as a speed-up capacitor. Thus, setting the capacitance of the capacitor C3 makes it possible to shorten the rise time and fall time at the time of changing to the potential of node N1.

As described above, the capacitor C3 has an F characteristic and is disposed in the vicinity of the p-type power transistor Q2.

Figure 2:
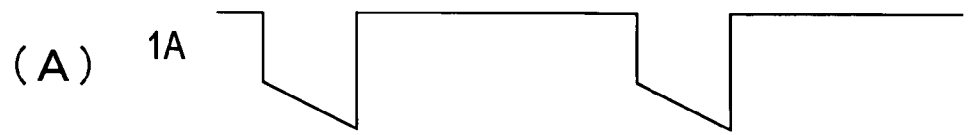
FIGS. 2 through 5 are potential waveform diagrams for explaining the operation of the SLIC of the first embodiment.
Figure 2:
Figure 3:
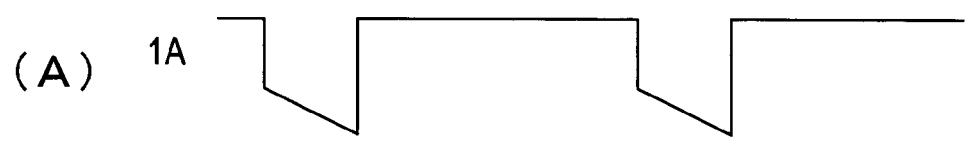
Figure 3:

FIG. 2 is a chart showing schematically the waveform of potential on both terminals of the capacitor C3 when the temperature is normal. FIG. 3 is a chart showing schematically the waveform of potential on both terminals of the capacitor C3 when the abnormal temperature occurs. In FIGS. 2 and 3, time is plotted against the abscissa and potential is plotted against the ordinate. When no abnormal temperature increase has occurred in the p-type power transistor Q2, the temperature of capacitor C3 is normal. Therefore, as shown in FIG. 2, the output terminal voltage (potential of node N1) of capacitor C3 follows the input terminal voltage (potential of the signal output terminal 1A of chip 1) and changes at a high speed. By contrast, when an abnormal temperature increase occurred in the p-type power transistor Q2, the temperature of capacitor C3 also becomes abnormally high. Therefore, the capacitance of capacitor C3 decreases. In this case, as shown in FIG. 3, the rise time of the output terminal voltage of capacitor C3 becomes significantly delayed with respect to the rise time of the input terminal voltage. The rise time of the output terminal voltage becomes longer with the decrease in the capacitance of capacitor C3 that is, increase in the temperature of capacitor C3.

As described hereinabove, the potential of node N1 is converted by the A/D converter 21 into a digital signal and transmitted to the monitor circuit. The monitor circuit 22 monitors changes in potential of node N1. Thus, when the potential rise time of node N1 becomes longer than the prescribed interval, a decision is made that an abnormal temperature increase has occurred. This decision result is sent to a processing circuit (not shown in the figures). The processing circuit outputs a reset signal when the decision was made that the abnormal temperature increase had occurred. This reset signal is input into the reset signal terminal R of chip 1 via the reset signal stabilization circuit 3. The chip 1 is reset by this reset signal and terminates the generation of DC voltage Vbat.

Examples of factors causing abnormal increase in the temperature of p-type power transistor Q2 include production spread of DC/DC converters 2 and malfunction of chip 1. For example, when defective capacitors or resistors are produced or the wiring is short circuited or broken, there is a risk of a large current flowing in the p-type power transistor Q2. Furthermore, when the chip 1 malfunctions, there is a risk that the duty ratio of control signals 1A, 1B will change and a large current will flow in the p-type power transistor Q2. The DC/DC converter 2 of the present embodiments can detect such an increase in temperature and reset the chip 1 by an external processing circuit. As a result of the reset, the operation of chip 1 is terminated and, therefore, the increase in temperature is terminated.

Figure 4:
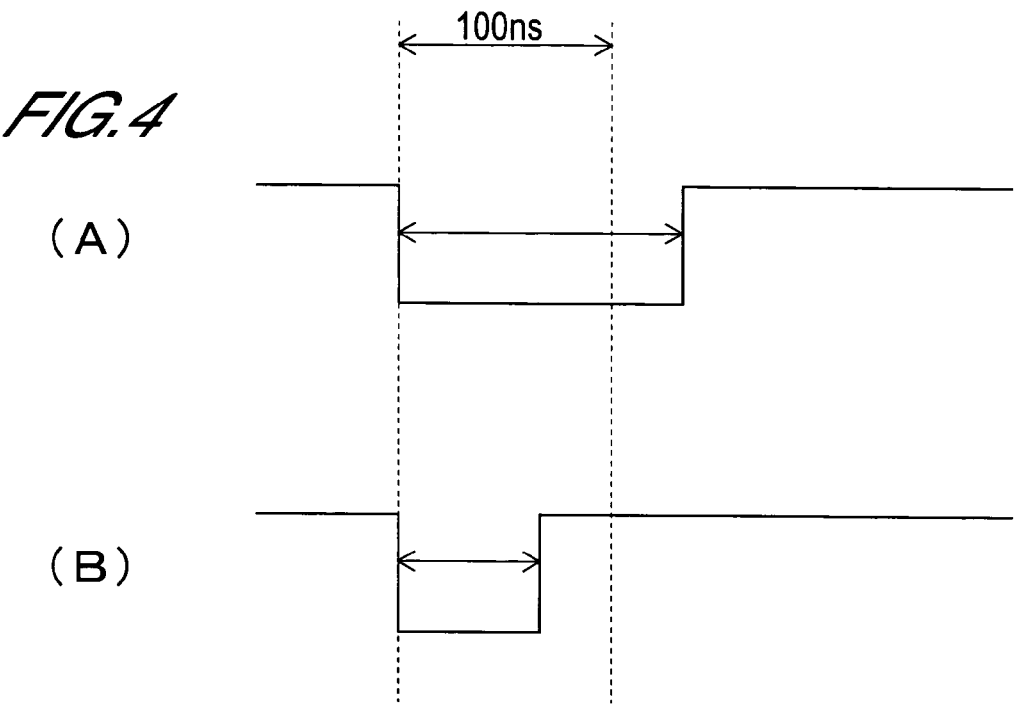
Figure 5:
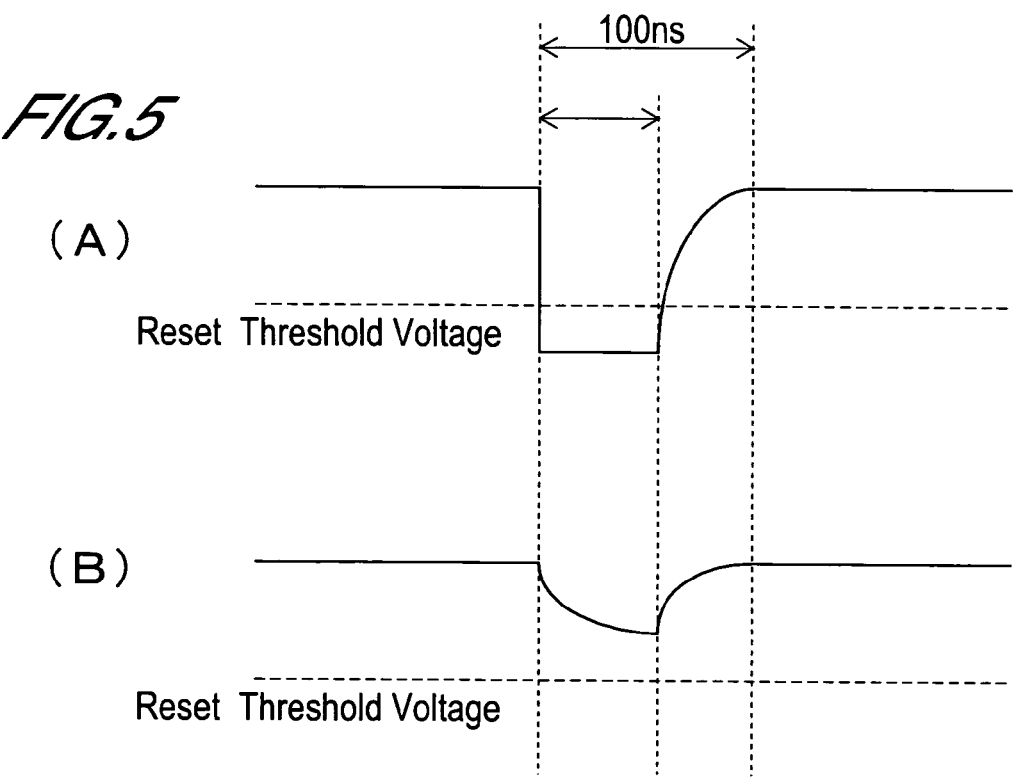

The operation principle of the reset signal stabilization circuit 3 will be described hereinbelow using the signal waveform diagrams shown in FIG. 4 and FIG. 5. In FIG. 4 and FIG. 5, time is plotted against the abscissa, and potential is plotted against the ordinate.

As described hereinabove, the reset signal stabilization circuit 3 comprises the resistor R4 and the capacitor C5, both of which are connected between the reset signal line RL and ground line GND. Such a configuration makes it possible to remove a high-frequency component of the reset signal and, therefore, to delay the rise of the reset signal. As a result, when a reset signal with a very short period of active level, that is, low level, is input, it is possible to prevent the chip 1 from resetting. For example, appropriately setting the values of resistor R4 and capacitor C5 makes it possible to prevent the chip 1 from resetting only in the case when the period of low level of the reset signal that was input into the reset signal stabilization circuit 3 is no less than 100 nanoseconds(see FIG. 4(A)). With such a setting, even when, e.g., electrostatic noise is superimposed on the reset signal line, if the low level time of the noise is less than 100 nanoseconds, the chip 1 cannot be set erroneously (see FIG. 4(B)).

The configuration is such that the chip 1 can be reset when the potential of the reset signal terminal R is lower than the threshold value, even if instantaneously. Therefore, when no reset signal stabilization circuit 3 is provided, if noise shown in FIG. 5A (that is, a signal which becomes at a potential below the threshold value only for a very short time) is inputted into the reset signal terminal R, the chip 1 malfunctions. By contrast, when the reset signal stabilization circuit 3 has been provided, a high-frequency component is removed from the noise shown in FIG. 5(A) and a waveform shown in FIG. 5(B) is obtained. Because waveform shown in FIG. 5(B) has a long fall time, the rise is initiated before the reset signal terminal R reaches to the threshold potential. Therefore, the chip 1 is not reset.

Usually, the noise has a very high frequency, and the low level time rarely becomes longer than 100 nanoseconds. Therefore, providing the reset signal stabilization circuit 3 can prevent the malfunction of chip 1 caused by the noise.

In the present embodiment, the reset signal was generated by a processing circuit (not shown in the figure), but the reset signal may be also directly generated by the monitor circuit 22.

Second Embodiment

Figure 6:
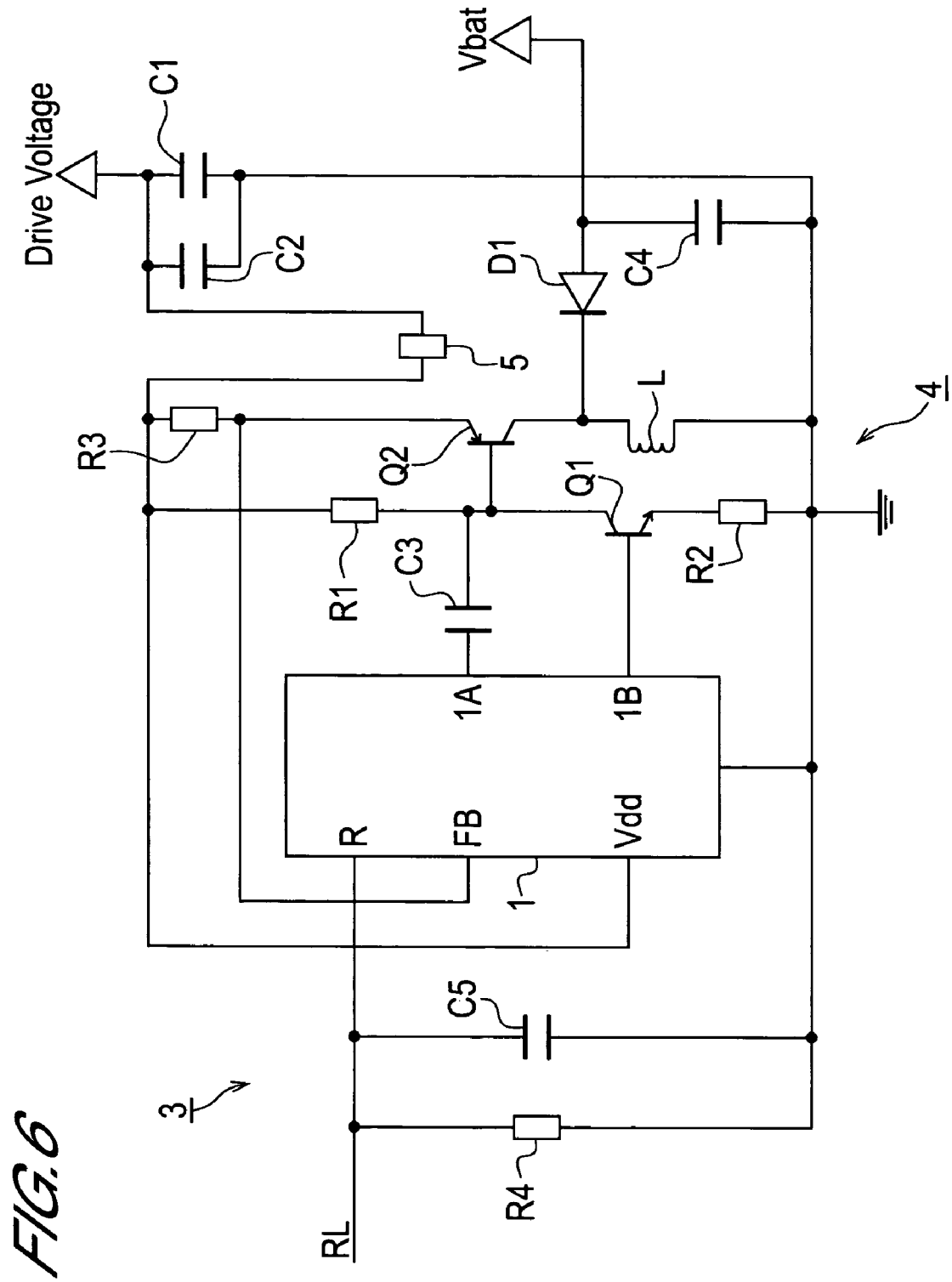
FIG. 6 is a circuit diagram of the main configuration of the SLIC of the second embodiment.

FIG. 6 is a circuit diagram illustrating the main configuration of the SLIC of the second embodiment.

In FIG. 6, structural elements denoted by the symbols identical to those in FIG. 1 are identical to respective elements shown in FIG. 1.

In the SLIC of the present embodiment, the configurations of the chip 1 and reset signal stabilization circuit 3 are identical to those of the SLIC (see FIG. 1) of the first embodiment.

The DC/DC converter 4 shown in FIG. 6 does not conduct temperature control using the capacitor C3. Therefore, the capacitor C3 is not required to have the F characteristic, it is also not necessary to dispose the capacitor in the vicinity of the p-type power transistor Q2. In addition, the A/D converter 21 and monitor circuit 22 are not mounted on the DC/DC converter 4.

The DC/DC converter 4 of the present embodiment comprises a polyswitch 5. The polyswitch 5 is connected by one terminal thereof to the drive power source line VDD and by the other terminal thereof to one terminal of resistor R1, R3 and the drive voltage input terminal Vdd of chip 1. As shown in FIG. 6, the polyswitch 5 is disposed close to the p-type power transistor Q2, that is, to a heat generating source.

The impedance of polyswitch 5 is substantially zero at a temperature not higher than a prescribed temperature (for example 120° C.). On the other hand, it is substantially infinitely large at a temperature higher than the prescribed temperature. Therefore, if the temperature of the p-type power transistor Q2 greatly increases, the supply of voltage to the source and-gate of the p-type power transistor Q2 and the supply of power to the chip 1 are terminates. As a result, no electric current flows in the p-type power transistor Q2 and, therefore, power generation by the p-type power transistor Q2 is terminated.

Once the polyswitch 5 assumes a high impedance, it does not return to a low impedance as long as the voltage of the drive power source line VDD is not reduced to zero volts by turning off the power source of the SLIC. Therefore, even if the temperature decreases after the operation of the p-type power transistor Q2 was terminated, the operation of the p-type power transistor Q2 cannot be restarted. In order to restart the operation of the DC/DC converter 4 after the termination of operation, the power source may be switched off and then switched on again after 20 to 30 seconds.

As described hereinabove, the SLIC of the present embodiment can control the temperature of the p-type power transistor Q2 and automatically terminate the operation when the temperature becomes abnormally high. In addition, the operation can be restarted merely by resetting the power source.

The polyswitch 5 may be located so as to interrupt the drive current of the p-type power transistor Q2. For example, the polyswitch 5 may be disposed between the resistor R3 and the source of transistor Q2 or between the drain of transistor Q2 and inductor L.

A fuse can be used instead of the polyswitch 5. In the DC/DC converter using a fuse, the fuse melts when the drain current of the p-type power transistor Q2 greatly increases, thereby terminating the operation. The melted fuse has to be replaced to restart the operation.

Third Embodiment

Figure 7:
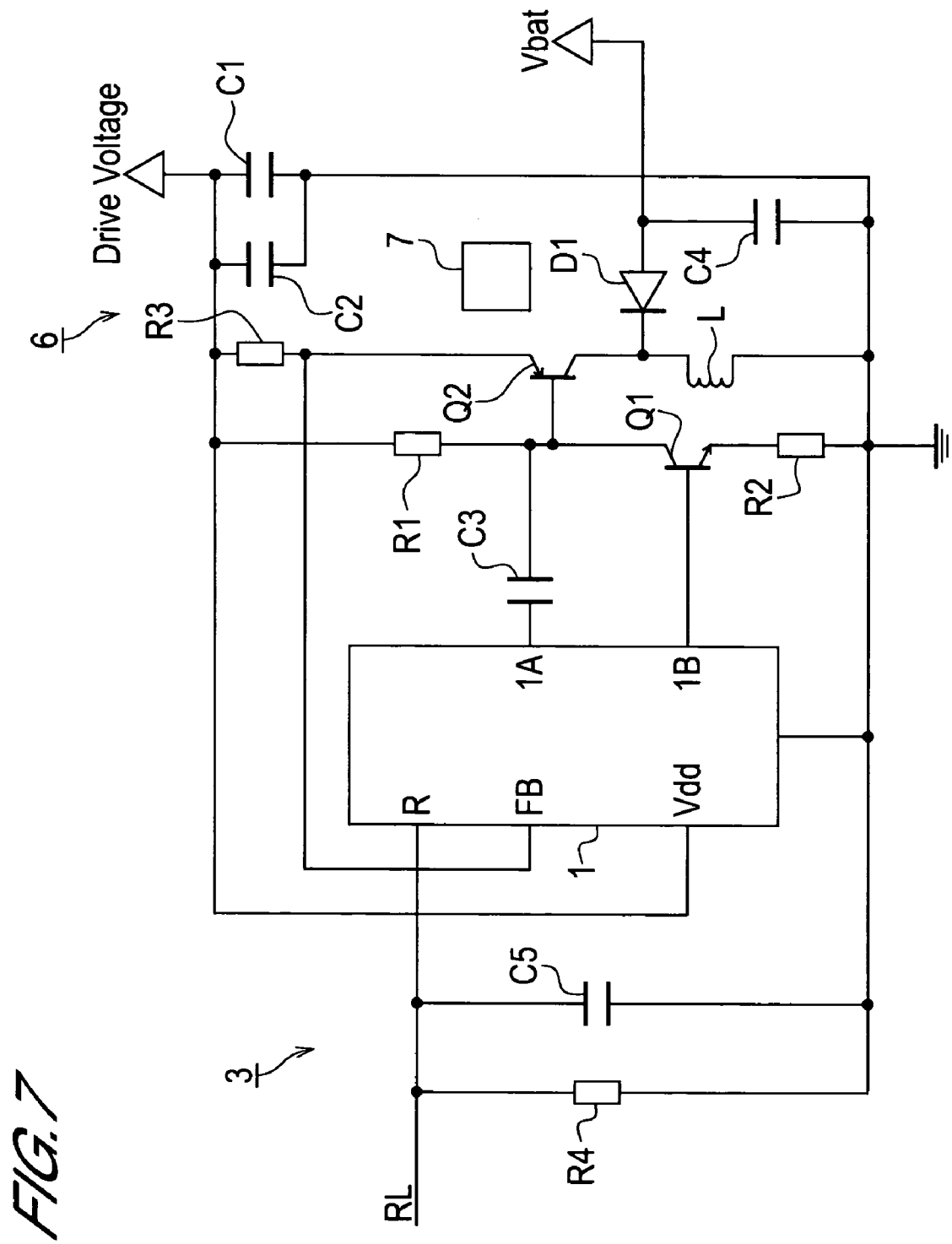
FIGS. 7 and 8 are circuit diagrams of the main configuration of the SLIC of the third embodiment.

FIG. 7 is a circuit diagram illustrating the main configuration of the SLIC of the third embodiment.

In FIG. 7, structural elements denoted by the symbols identical to those in FIG. 1 are identical to respective elements shown in FIG. 1.

In the SLIC of the present embodiment, the configurations of the chip 1 and reset signal stabilization circuit 3 are identical to those of the SLIC (see FIG. 1) of the first embodiment.

The DC/DC converter 6 shown in FIG. 7 does not conduct temperature control using the capacitor C3. Therefore, the capacitor C3 is not required to have the F characteristic, it is also not necessary to dispose the capacitor in the vicinity of the p-type power transistor Q2. In addition, the A/D converter 21 and the monitor circuit 22 are not carried on the DC/DC converter 6.

Figure 8:
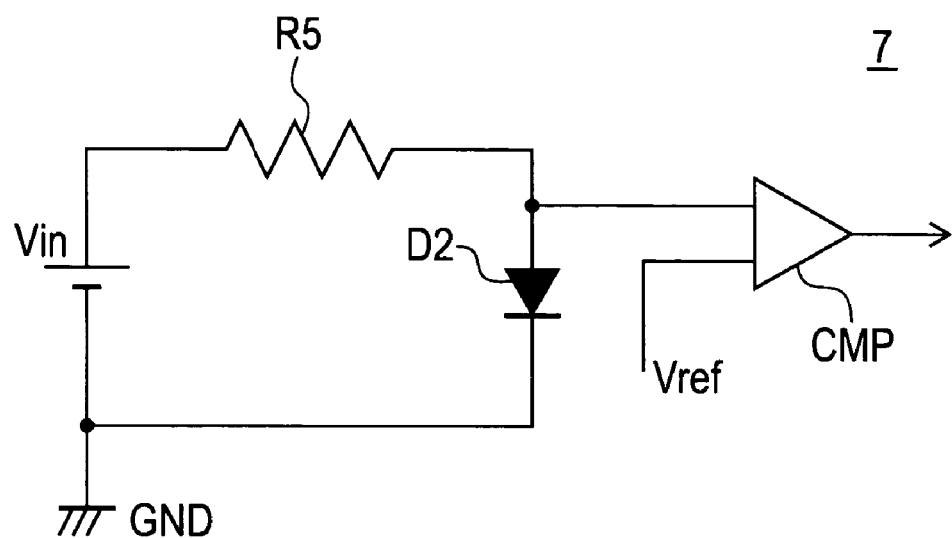

The DC/DC converter 6 of the present embodiment comprises a high temperature detection circuit 7. FIG. 8 illustrates an example of the internal configuration of high temperature detection circuit 7. As shown in FIG. 8, the high temperature detection circuit 7 comprises a DC power source Vin, a resistor R5, a diode D2, and a comparator CMP. The resistor R5 is connected by one terminal thereof to the positive electrode of DC power source Vin and by the other terminal thereof to the anode of diode D2. The cathode of diode D2 and a negative electrode of DC power source Vin are connected to the ground line GND. The comparator CMP inputs the anode potential of diode D2 and a reference potential Vref and outputs the comparison results of the two potentials. The diode D2 is disposed as close to the p-type power transistor Q2 (see FIG. 7) as possible.

A forward current flows in the diode D2. It is well known that when a forward current flows, the voltage between the anode and cathode of diode D2 is 0.7 V at a temperature close to room temperature. The cathode of diode D2 is connected to the ground line GND. Therefore, the anode potential of diode D2 is 0.7 V. However, the voltage between the anode and cathode of diode D2 decreases as the temperature increases. The voltage between the anode and cathode decreases to, for example, about 0.4 V when the temperature becomes very high. For this reason, the temperature increase in the p-type power transistor Q2 can be detected by setting the reference voltage to, for example, 0.5 V.

The output of comparator CMP is transmitted to the processing circuit (not shown in the figure). This processing circuit sends a reset signal to the chip 1 when a decision was made that the abnormal temperature increase had occurred.

As described hereinabove, the SLIC of the present embodiment can detect the temperature of the p-type power transistor Q2 and automatically terminate the operation when the temperature has abnormally increased.

In the present embodiment, the reset signal was assumed to be generated by the processing circuit (not shown in the figure), but it may be directly generated by the high temperature detection circuit 7.

A high temperature detection circuit using, for example, a temperature sensor, can be used instead of the high temperature detection circuit 7 using a diode.

What is claimed is:

1. A DC/DC converter, comprising:
   a loop circuit for accumulating electromagnetic energy in an inductor when an electric current is supplied and generating a negative DC voltage by causing a loop electric current to flow by using the electromagnetic energy accumulated in said inductor when no electric current is supplied;
   a power transistor for supplying the electric current supplied from a drive power source line to said loop circuit when the potential of a control pulse signal is at an active level;
   an abnormal high temperature detection circuit for detecting a normal/abnormal state of temperature of said power transistor; and
   an abnormality processing circuit for making said power transistor not to supply the electric current to said loop circuit when said abnormal high temperature detection circuit has detected that the temperature of said power transistor is abnormal,
   wherein said inductor is connected by one terminal thereof to one main electrode of said power transistor and by the other terminal thereof to a ground line; and said loop circuit comprises said inductor, a capacitor having one terminal thereof connected to the other terminal of said inductor, and a diode having an anode thereof connected to the other terminal of said capacitor and a cathode thereof connected to one terminal of said inductor.

2. The DC/DC converter according to claim 1, wherein said power transistor inputs said control pulse signal to a control terminal from a speed-up capacitor.

3. The DC/DC converter according to claim 2, wherein the control terminal of said power transistor is connected to said drive power source line and connected to the ground line via a transistor which is switched on/off at the same time as said power transistor.

4. The DC/DC converter according to claim 2, wherein
   said speed-up capacitor is a capacitor which has an F characteristic and is disposed in the vicinity of said power transistor; and
   said abnormal high temperature detection circuit detects the normal/abnormal state of temperature of said power transistor by measuring the potential variation rate in the connection point of said speed-up capacitor and the gate of said power transistor.

5. The DC/DC converter according to claim 4, wherein said abnormal high temperature detection circuit comprises:

an A/D converter for converting the potential of the connection point of said speed-up capacitor and the gate of said power transistor into a digital signal; and a monitor circuit for monitoring said potential variation rate by using the digital signal inputted from said A/D converter.

6. The DC/DC converter according to claim 1, wherein said abnormal high temperature detection circuit and said abnormality processing circuit are composed of a polyswitch connected between said drive power source line and said power transistor and disposed in the vicinity of said power transistor.

7. The DC/DC converter according to claim 1, wherein said abnormal high temperature detection circuit and said abnormality processing circuit are composed of a fuse connected between said drive power source line and said power transistor and disposed in the vicinity of said power transistor.

8. The DC/DC converter according to claim 1, wherein said temperature detection circuit detects the normal/abnormal state of temperature of said power transistor by comparing the forward voltage of the diode disposed in the vicinity of said power transistor with a reference potential.

9. The DC/DC converter according to claim 1, wherein said temperature detection circuit detects the normal/abnormal state of temperature of said power transistor by using a temperature sensor disposed in the vicinity of said power transistor.

10. The DC/DC converter according to claim 1, wherein said abnormality processing circuit makes said power transistor not to supply the electric current td said loop circuit by fixing said control pulse signal to a non-active level.

11. The DC/DC converter according to claim 1, further comprising one or more capacitors for stabilizing the drive voltage, said capacitor(s) having one terminal thereof connected to said drive power source line and the other terminal thereof connected to the ground line.

12. A subscriber line interface circuit, comprising:

a loop circuit for accumulating electromagnetic energy in an inductor when an electric current is supplied and generating a negative DC voltage by causing a loop electric current no flow by using the electromagnetic energy accumulated in said inductor when no electric current is supplied;

a power transistor for supplying the electric current supplied from a drive power source line to said loop circuit when the potential of a control pulse signal is at an active level;

an SLIC control circuit for generating said control pulse signal of a duty ratio corresponding to the value of the DC voltage generated by said loop circuit;

an abnormal high temperature detection circuit for detecting a normal/abnormal state of temperature of said power transistor; and an abnormality processing circuit for making said power transistor not to supply the electric current to said loop circuit when said abnormal high temperature detection circuit has detected that the temperature of said power transistor is abnormal, wherein said inductor is connected by one terminal thereof to one main electrode of said power transistor and by the other terminal thereof to a ground line, and wherein said loop circuit comprises said inductor, a capacitor having one terminal thereof connected to the other terminal of said inductor, and a diode having an anode thereof connected to the other terminal of said capacitor and a cathode thereof connected to one terminal of said inductor.

13. The subscriber line interface circuit according to claim 12, wherein said power transistor inputs said control pulse signal to a control terminal from a speed-up capacitor.

14. The subscriber line interface circuit according to claim 13, wherein the control terminal of said power transistor is connected to said drive power source line and connected to the ground line via a transistor which is switched on/off at the same time as said power transistor.

15. The subscriber line interface circuit according to claim 14, wherein said speed-up capacitor is a capacitor which has a F characteristic and is disposed in the vicinity of said power transistor; and said abnormal high temperature detection circuit detects the normal/abnormal state of temperature of said power transistor by measuring the potential variation rate in the connection point of said speed-up capacitor and the gate of said power transistor.

16. The subscriber line interface circuit according to claim 15, wherein said abnormal high temperature detection circuit comprises:

an A/D converter for converting the potential of the connection point of said speed-up capacitor and the gate of said power transistor into a digital signal; and a monitor circuit for monitoring said potential variation rate by using the digital signal inputted from said A/D converter.

17. The subscriber line interface circuit according to claim 12, said abnormal high temperature detection circuit and said abnormality processing circuit are composed of a polyswitch connected between said drive power source line and said power transistor and disposed in the vicinity of said power transistor.

18. The subscriber line interface circuit according to claim 12, said abnormal high temperature detection circuit and said abnormality processing circuit are composed of a fuse connected between said drive power source line and said power transistor and disposed in the vicinity of said power transistor.

19. The subscriber line interface circuit according to claim 12, wherein said temperature detection circuit detects the normal/abnormal state of temperature of said power transistor by comparing the forward voltage of the diode disposed in the vicinity of said power transistor with a reference potential.

20. The subscriber line interface circuit according to claim 12, wherein said temperature detection circuit detects the normal/abnormal state of temperature of said power transistor by using a temperature sensor disposed in the vicinity of said power transistor.

21. The subscriber line interface circuit according to claim 12, wherein said abnormality processing circuit makes said power transistor not to supply the electric current to said loop circuit by fixing said control pulse signal to a non-active level.

22. The subscriber line interface circuit according to claim 21, wherein said abnormality processing circuit fixes said control pulse signal to a non-active level by resetting said SLIC control circuit.

23. The subscriber line interface circuit according to claim 12, further comprising one or more capacitors for stabilizing the drive voltage, said capacitor(s) having one terminal thereof connected to said drive power source line and the other terminal thereof connected to the ground line.

24. The subscriber line interface circuit according to claim 12, further comprising a reset signal stabilization circuit for removing the effect of noise from the reset signal which is inputted into said SLIC control circuit.

25. The subscriber line interface circuit according to claim 24, wherein said reset signal stabilization circuit comprises a resistor and a capacitor connected by one terminal thereof to a reset signal terminal of said SLIC control circuit and by the other terminal thereof to the ground line.

26. The subscriber line interface circuit according to claim 25, wherein the values of said resistor and capacitor are set so that when noise having a pulse width of not higher than the prescribed value has been generated, the minimum potential of this noise does not become less than the operation threshold value of said SLIC control circuit.

* * * * *